June 29, 1926. 1,590,226
C. L. BOISSET
HYDRAULIC STEERING APPARATUS FOR TRACTORS
Filed Feb. 10, 1921 5 Sheets-Sheet 3

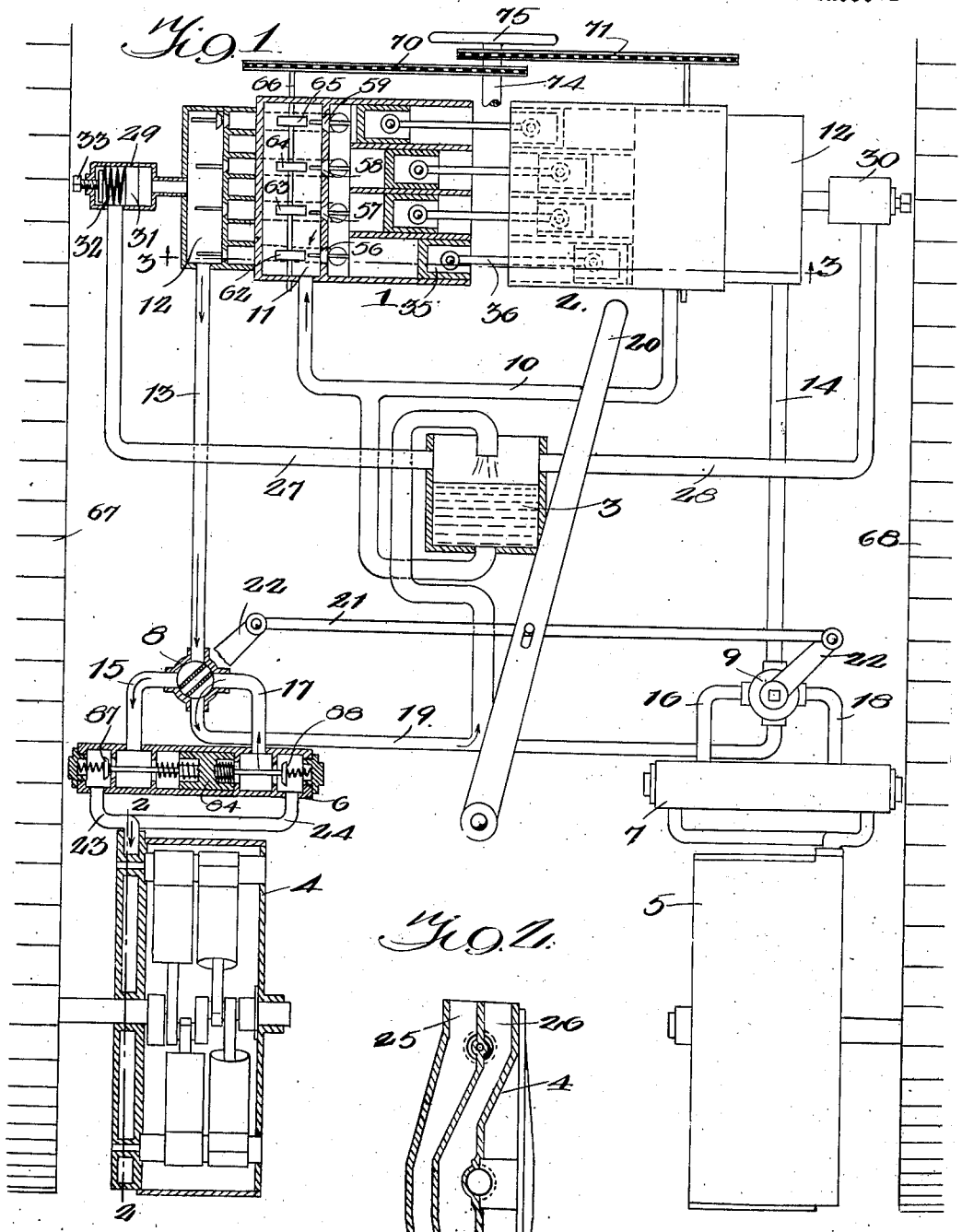

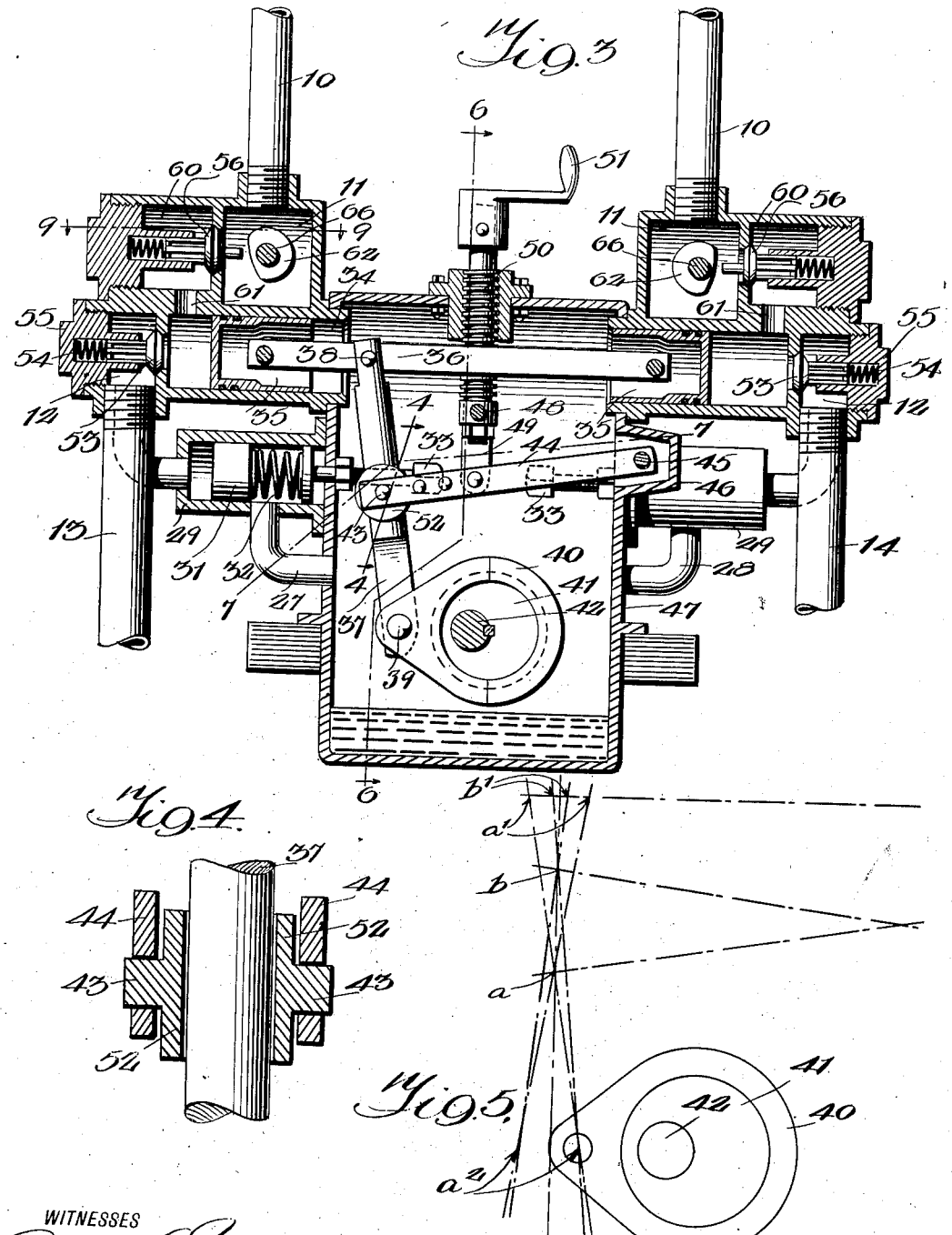

WITNESSES
George C. Myers
J. T. Schrott

INVENTOR
CHARLES L. BOISSET,
BY
ATTORNEYS

June 29, 1926.
C. L. BOISSET
1,590,226
HYDRAULIC STEERING APPARATUS FOR TRACTORS
Filed Feb. 10, 1921    5 Sheets-Sheet 4
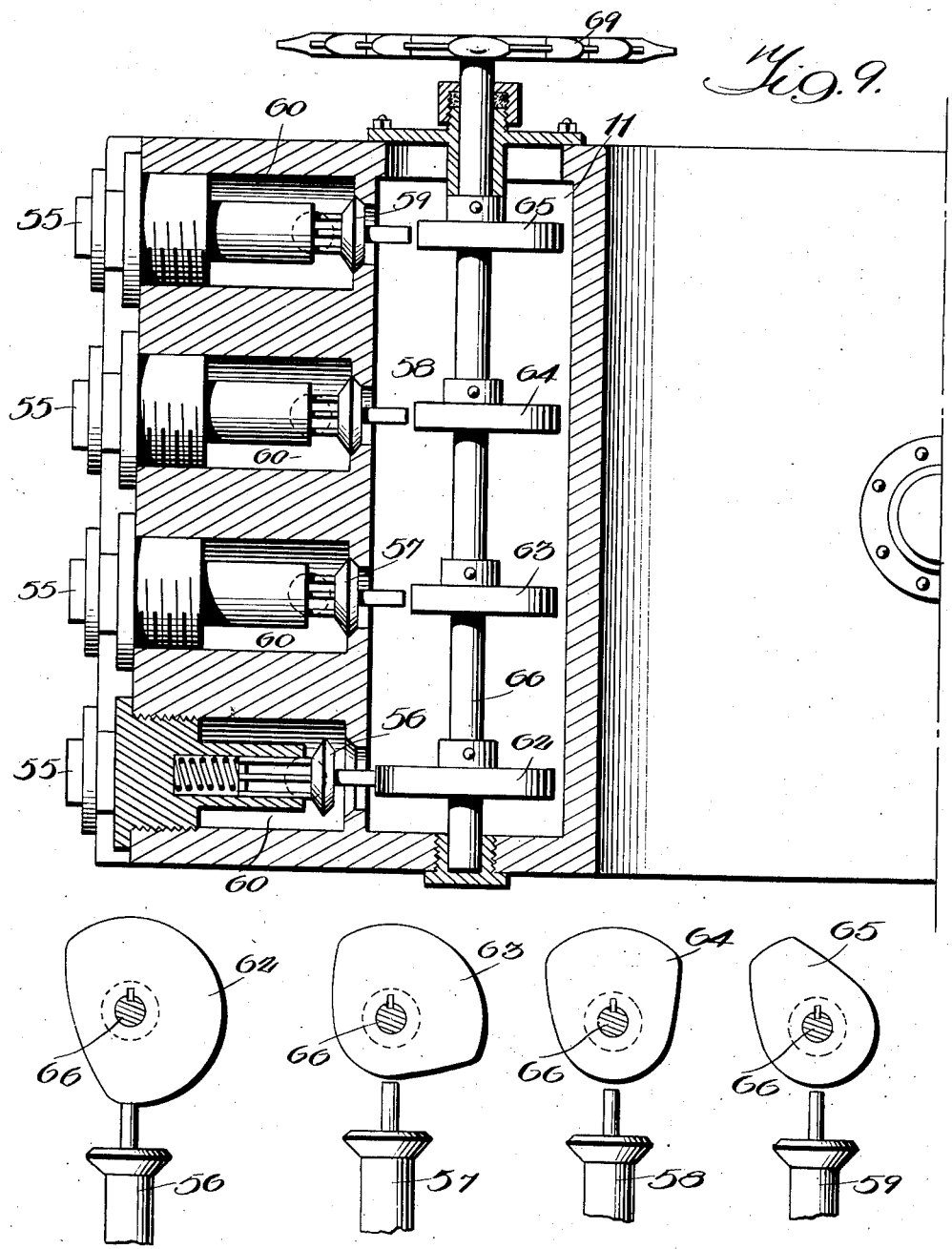
INVENTOR
CHARLES L. BOISSET,
ATTORNEYS June 29, 1926.
C. L. BOISSET
1,590,226
HYDRAULIC STEERING APPARATUS FOR TRACTORS
Filed Feb. 10, 1921   5 Sheets-Sheet 5
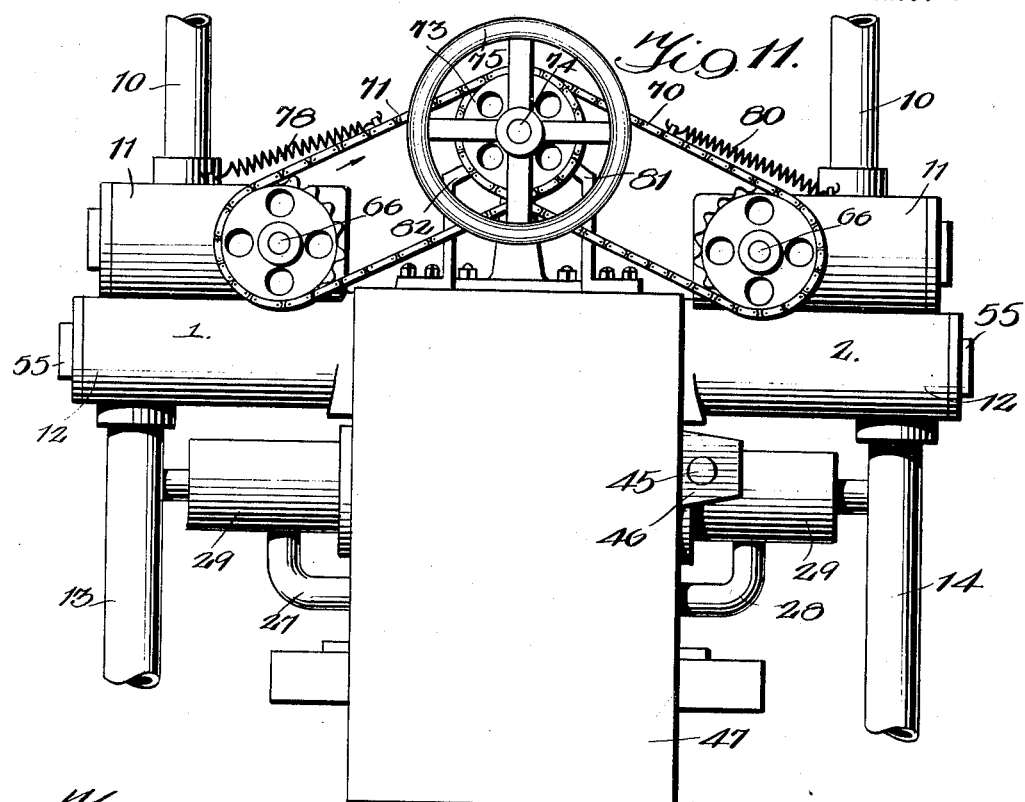
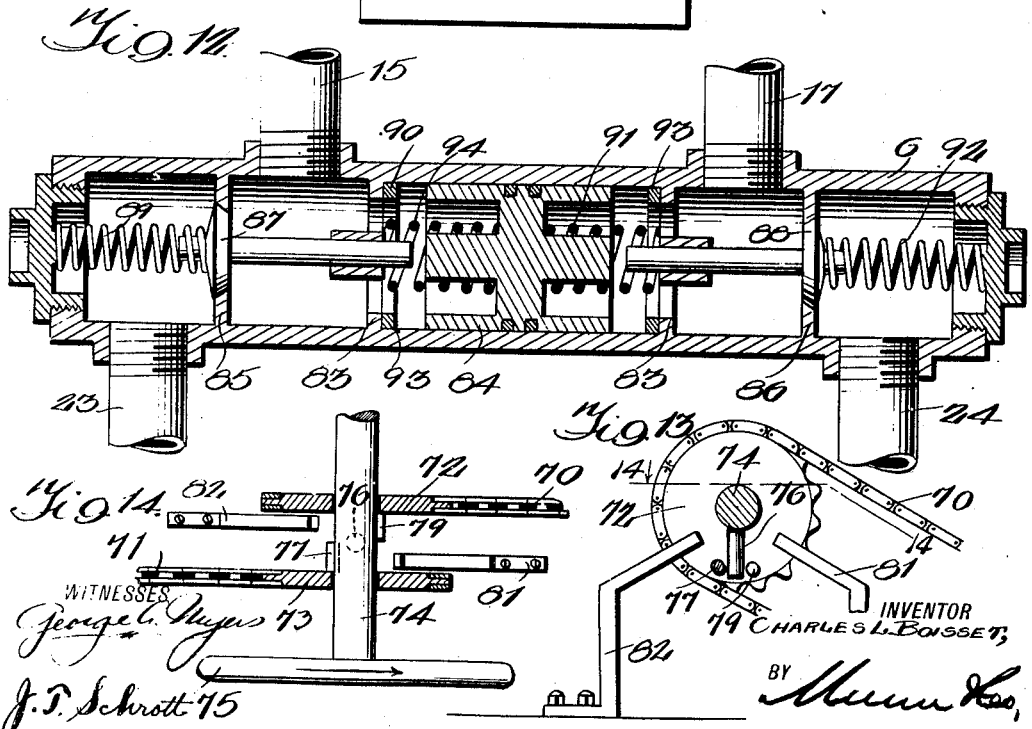

Patented June 29, 1926.

1,590,226

UNITED STATES PATENT OFFICE.

CHARLES LEON BOISSET, OF NEW ORLEANS, LOUISIANA.

HYDRAULIC STEERING APPARATUS FOR TRACTORS.

Application filed February 10, 1921. Serial No. 444,027.

My invention relates to improvements in hydraulic transmissions, it being more particularly an improvement on the hydraulic transmission disclosed in my copending application for Letters Patent filed June 5, 1920, Serial No. 386,764, and it consists in the constructions, combinations and mode of operation herein described and claimed.

One of the foremost objects of the invention is to provide a hydraulic transmission designed especially for application to tractors, to this end there being an arrangement whereby the tractor can be steered by a peculiar manipulation of the motors of the treads.

A further object of the invention is to provide a hydraulic transmission for tractors, arranged so that the motors of the respective treads can be run at different speeds in steering, instead of stopping one motor entirely as is the prevailing custom, thereby avoiding imposing all of the load on only one motor.

A further object of the invention is to provide an anti-coasting device operating in conjunction with the motors and pumps, and functioning particularly to enable steering of the tractors when coasting downhill.

Figure 6:
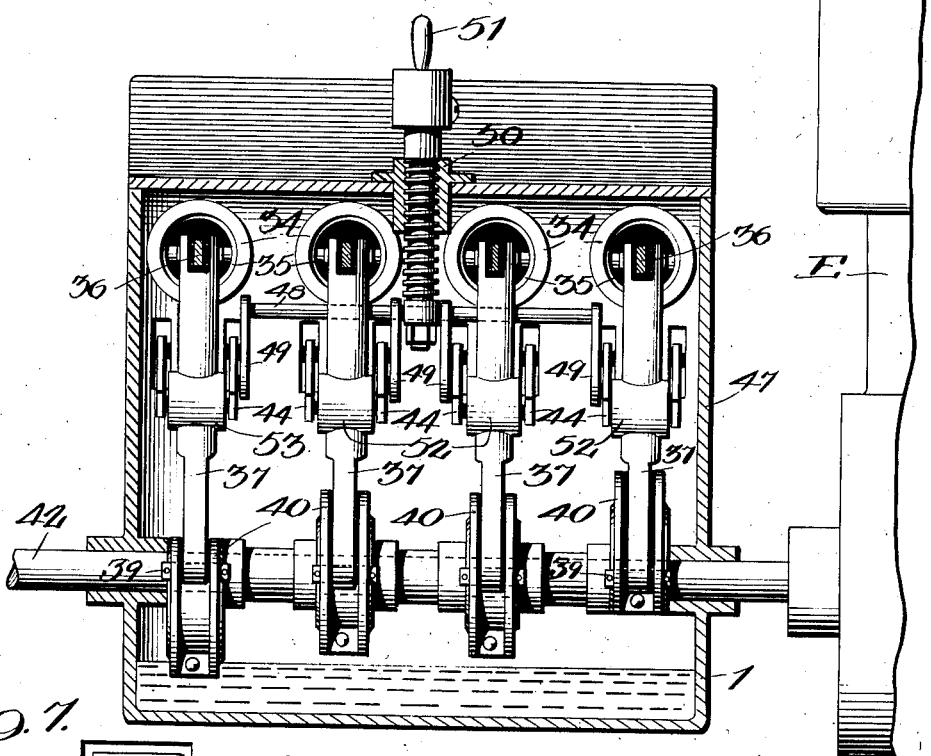
Figure 7:
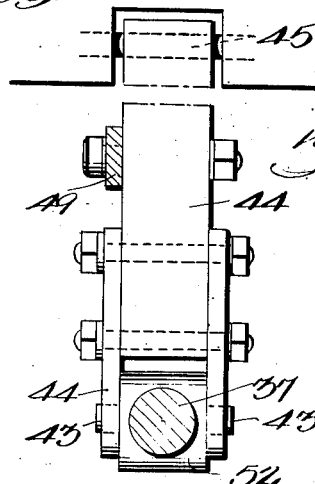
Figure 8:
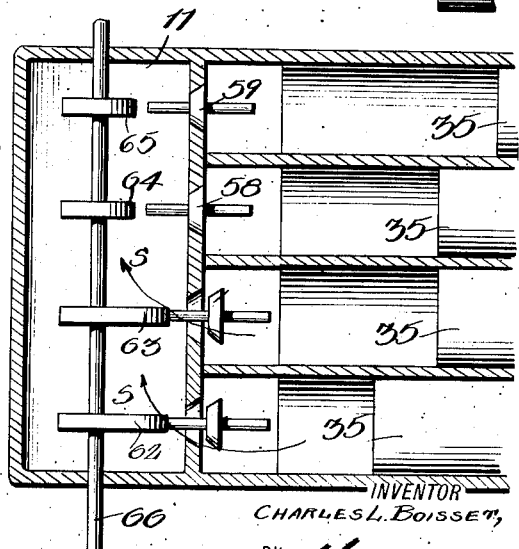

Other objects and advantages will appear in the following specification, reference being had to the accompanying drawings, in which:

Figure 1 is a diagram illustrating the application of the hydraulic apparatus to a tractor, Figure 2 is a longitudinal section on the line 2—2 of Figure 1, showing the inlet and outlet ports of one of the hydraulic motors, Figure 3 is a cross section of the pump, taken substantially on the line 3—3 of Figure 1, it being observed, however, that the positions of the inlet valves and opening cams are changed in Figure 1 so as to aid the purpose of the diagram, Figure 4 is a detail section taken on the line 4—4 of Figure 3, Figure 5 is a diagram showing how the radius link and universal joint can be adjusted to vary the pump stroke, Figure 6 is a vertical section taken substantially on the line 6—6 of Figure 3, Figure 7 is a detail horizontal section taken on the line 7—7 of Figure 3, Figure 8 is a diagrammatic section corresponding to a part of Figure 1, showing a number of the inlet valves open to produce a local circulation of the fluid and thereby retard the speed of the companion motor, as in turning, Figure 9 is a detail section taken on the line 9—9 of Figure 3, illustrating the inlet valves and opening cams, collectively designated hereinafter "the hydraulic steering means", Figure 10 is a diagram illustrating the shapes and positions of the four cams in the hydraulic steering means, Figure 11 is an end elevation in the pumps, etc. and steering wheel, as viewed from a position at the top of Figure 1, Figure 12 is a detail longitudinal section of the anti-coasting device, assuming a position as when the tractor goes downhill and said device functions to close off the motor, Figure 13 is an elevation showing the means for turning the steering sprockets through four-fifths of a turn by right and left movements of the steering wheel, and Figure 14 is a horizontal section taken substantially on the line 14—14 of Figure 13.

The hydraulic system, illustrated diagrammatically in Figure 1, comprises the tandem multi-cylinder pumps 1 and 2, the fluid reservoir 3, independent hydraulic motors 4 and 5, and the companion anti-coasting devices 6 and 7. Above each anti-coasting device is a valve 8 and 9, for the purpose of reversing the motors, and embodied in each pump is the hydraulic steering means, shown in detail in Figure 9, which can be recognized in Figure 1 by the cams and adjacent inlet valves.

There is no particular virtue in the arrangement of piping which connects the various devices mentioned above, some other arrangement probably doing equally as well, but in order to illustrate and describe one form, there is a pipe 10 with branches to the inlet chambers 11 of the pumps, and a connection to the bottom of the reservoir 3 so that the fluid may flow out and into the system. From the outlet chamber 12 of each pump there is a pipe 13, 14 respectively leading to the valves 8 and 9.

The plugs of the valves 8 and 9 are set to establish communication between the pipes 13 and 14 and short pipes 15 and 16 leading to one side of each anti-coasting device. Similar short pipes 17 and 18 lead from opposite sides of the valves to opposite ends of said devices. These last pipes now act as returns for the fluid through the valves to the common return pipe 19, which has a connection discharging into the top of the reservoir.

Should it be desired to reverse the operation of the motors, the lever 20 is shifted toward the left, in turn shifting the positions of the valve plugs by means of the connections 21 and 22, so that the fluid from the pipes 13 and 14 travels in a direction opposite from that now indicated, with the consequent result of reversing the motors. Pipes 23 and 24, leading from the opposite end of each anti-coasting device, respectively communicate with the inlet and outlet ports 25 and 26 of each motor. These ports are of course reversed in designation when the motor is reversed.

Pipes 27 and 28 lead into the reservoir 3 from the cushion cylinders 29 and 30, which in turn communicate with the pump outlet chambers. These devices take the place of the customary air chamber as used on ordinary water pumps, but inasmuch as no air is used in them the emulsification of the fluid is avoided. The purpose of each shock absorber is to provide a by-pass for the fluid should an excessively high pressure be reached. In such event, the piston 31 will recede against the compression of the spring 32, letting the fluid enter the pipe 27 (for example) and so back to the reservoir, or in fact any other convenient place within the system. The tension of the spring 32 is adjustable by the means 33.

The pump is described by itself so that the reader may consider the construction in detail, as is also the hydraulic steering means and the anti-coasting device in the description below. The pump per se forms the subject matter of a copending application for Letters Patent filed February 10, 1921, Serial No. 444,026 and is disclosed herein only as a necessary foundation for the steering means which is designed especially for tractors.

Attention is directed to Figures 1, 3 and 6. The pumps designated 1 and 2 in Figure 1, although working individually in respect to the motors 4 and 5, are part of a unitary structure. And since the action of one pump is precisely like that of the other, the following description of one side will suffice for both. There is a plurality of cylinders 34, four being shown in the present instance. In each there is a piston 35. The pistons of opposing cylinders are joined by a connecting rod 36.

Each connecting rod has a rocker bar 37 pivoted thereto at 38, the lower end of each bar being pivoted at 39 to the strap 40 of an eccentric 41 on the engine shaft 42. This shaft is part of the engine E, only generally designated in Figure 6. The engine operates to turn the shaft 42, revolve the eccentrics, rock the bars 37, and reciprocate the pistons through the rods 36 and so pump fluid into the system.

Pivotally connected at 43 to each of the rocker bars 37 is a radius link 44, each in turn pivoted at 45 in an extension 46 of the pump casing 47. It is desirable to have the radius link 44 quite long, and in actual practice the extension 46 will be deeper than shown so as to enable disposing the pivot 45 farther out.

As shown in Figure 6, all of the radius links 44 are hung on a lift rod 48 by straps 49, so that when the square-threaded screw 50 is turned by means of the crank 51, all radius links are raised together so as to slide the joint 52 into a different position on each rocker bar 37. This joint constitutes the fulcrum for each rocker bar. The diagram in Figure 5 illustrates approximately the extremities of position of the fulcrum or joint.

When the fulcrum 43 is at the lowermost point indicated $a$ the distance of movement $a'$ of the connecting rod 36 is about the same as the distance of movement $a^2$ of the eccentric strap. When the fulcrum 43 is raised to the uppermost position $b$, the movement $a^2$ of the eccentric is reduced to the distance $b'$ at the connecting rod 36. Thus we have represented high and low and all intermediate ranges of speed of the pump. These of course corresponding to the volumes of fluid discharged at the various adjustments of piston movement. By shifting the fulcrum anywhere between its extreme positions, unlimited ranges of motor speeds are gotten, this by varying the stroke of the pump, although the engine which drives that pump always operates at an approximately uniform speed.

The joint 52, while of course capable of being made in more than one way, is in the present instance constructed of a short section of round rod, bored transversely of the axis for the reception of the round part of the rocker bar 37. The ends of this rod section are fitted with trunnions which are described above as fulcrums 43. A detail of the joint is shown in Figure 4.

Ahead of each piston 35 there is the outlet chamber 12 which is common to all outlet valves 53. These have seats in a wall which divides the cylinders 34 from the outlet chamber. Springs 54 in screw caps 55, keep the valves normally seated, these caps being arranged to provide bearing for the valves. It is from the chamber 12 that the outlet pipe 13 leads. Arranged above the cylinders 34 is the inlet chamber 11, and the description of this chamber with its associated parts introduces the hydraulic steering means well shown in Figures 1, 9 and 10. The inlet chamber 11 is common to all of the inlet valves respectively designated 56, 57, 58 and 59, the respective valves, however, discharging into individual compartments 60. From each of these there is a port 61 leading into a cylinder 34.

Adjacent each of the valves 56, etc., is a cam, the respective ones being indicated 62, 63, 64 and 65. Each is of a different shape as shown in Figure 10. It is intended that each fifth of a turn of the cam shaft 66 shall bring successive ones of the cams into engagement with corresponding ones of the valves, so as to hold them open and cause the production of a local circulation of the fluid, instead of permitting the whole volume of fluid to travel to the motor.

It is by this means that the vehicle is steered. Take for example Figure 8. The shaft 66 has been rotated two-fifths of a turn to bring first the cam 62, then the cam 63 against the pins of the valves 56 and 57, thereby holding the two open. Each stroke of the companion pistons 35 will cause a surge of fluid into the common inlet chamber 11, instead of forcing the fluid out of the respective cylinders into the outlet chamber 12 and so into the system. The local circulation represented by the arrows s reduces the speed of the motor approximately one-half.

A further turn of the shaft 66 would cause the opening of the next valve 58, reducing the speed three-fourths, and an opening of all of the valves would stop the motor. It is not intended to totally stop the motor because that is a defect in prevailing constructions, which the present arrangement seeks to remedy. By varying the speed of one or the other of the motors, so that the treads 67, 68 are made to travel slower either one or the other as the case may be, the steering of the tractor is accomplished without any extraordinary wear on the machine, as is the case should one of the motors and its corresponding tread be stopped entirely.

In respect to the shape of the cams in Figure 10, a brief additional statement will make it clear that the reason for their progressively smaller shapes is to enable bringing them into operative position against the respective valves in succession, then holding those valves open. Each cam shaft carries a sprocket 69, connected by chains 70 and 71 to sprockets 72, 73, both loose on the steering shaft 74. This shaft carries a wheel 75 by which it is turned.

On turning the hand wheel 75 to the right (for example) the finger 76 fixed on the shaft, causes the sprocket 73 to move to the right, pulling on the upper strand of the chain 71, and consequently rotating the cam shaft 66 in the manner described above, this by virtue of the engagement of the finger 76 with a pin 77 on that sprocket. The spring 78, connected between the chain 71 and a fixed support, returns the parts when the hand wheel 75 is released.

A similar pin 79 on the sprocket 72 is engageable by the finger 76 on turning the hand wheel 75 to the left, thereby pulling on the upper strand of the chain 70 against the tension of the spring 80, for the operation of the cam shaft on the other side. Thus, steering is accomplished in either direction. Stops 81 and 82 cooperate with the pins 77 and 79 respectively in limiting the movement of the steering shaft 74 to four-fifths of a turn. Means for preventing the tractor from gathering momentum in going downhill is provided in the anti-coasting device, which is illustrated in Figures 1 and 12. It comprises a casing 6 with innermost partitions 83 defining a cylinder in which the double piston 84 operates, and outermost partitions 85, 86 which have seats occupied by valves 87 and 88. Assuming the fluid to be entering by way of the pipe 15, the piston 84 first moves toward the right by virtue of its greater area, and unseats valve 88, thus starting the operation of the motor. Then valve 87 is unseated against the tension of its spring 89, by virtue of the pressure. The fluid enters the middle cylinder or chamber by way of ports 90 in the partition 83, pressing the double piston 84 toward the right against the tension of the spring 91, as indicated before.

Upon the unseating of valve 88 against the tension of its spring 92, a conduit is opened for the return of the fluid by way of pipes 24 and 17, by this means enabling starting of the motor. Assume now that the tractor reaches an incline down which it will gather momentum, and the motor 4 will cease to operate as a motor but become a pump. The moment that such tendency is exhibited, there is a drop in pressure in the pipe 15 and on the left side of the double piston 84.

That piston immediately returns to approximately a mid position, or in any event, will release the stem of the valve 88 sufficiently to enable that valve to close. However, the valve 88 will not close entirely, assuming the pumps to be still working, because the pressure at the left of the piston 84 would always reach a point sufficient to keep the valve 88 open and insure some circulation of fluid even though it be very limited. Since the return conduit from the motor is practically closed, it naturally follows that the motor is cut out. The anti-coasting device also functions upon turning of the tractor. In order to effect a very short turn the four inlet valves of one pump are opened (the pump on the side toward which the turn is to be made, with the result that there will be no pressure on the piston 84 to hold the valve 88 open. Consequently the motor will cease to operate, and the tread on that side will serve as a pivot on which the tractor turns. It is thus evident that the motors are directly dependent on the pumps.

The anticoasting device therefore insures perfect control of the hydraulic motors by keeping them from coasting or acting as pumps, as described above, thus making them absolutely dependent on the pumps 1 and 2 and hence of the operator in so far as guarding against coasting is concerned. This anti-coasting device can be used with hydraulic pumps on tractors, multiple drive wheel machines, or any other device where a differential motion is not wanted but where absolute control is necessary. The anti-coasting device functions automatically.

At each end of the mid cylinder there is a washer 93 which prevents the double piston 84 from moving too far in either direction. And to this end the washers may be of various thicknesses so as to effect an adjustment of the distance of piston movement. There is a spring 94, corresponding to the spring 91, at the left side of the piston, for the same purpose as that of the latter.

In conclusion, it is desired to point out functions of the cushion cylinders, in addition to that mentioned above. One of the main objects of the cushion cylinders is to provide an elastic abutment for the liquid under pressure. This elasticity is provided by the spring 32 behind the piston 31. It is useful in insuring a prompt closure of the fluid outlet valves 53 (Fig. 3) this by virtue of the fact that the spring 32 maintains a constant back pressure on the fluid in the outlet chamber 12. It equalizes the flow of liquid from pump to motor, and it imparts a certain flexibility to the transmission of power from the pump to the motor, besides acting as a safety valve.

While the construction and arrangement of the improved hydraulic steering apparatus as heren described and claimed, is that of a generally preferred form, obviously modifications and changes may be made without departing from the spirit of the invention or the scope if the claims.

I claim:—

1. Apparatus of the character described having a tread, a fluid pump, a hydraulic motor for driving the tread, supply and return fluid conduits between the pump and motor, and means interposed in said pipe for preventing the motor acting as a pump when going down hill comprising a cylinder containing a pair of valves, partitions providing seats to be occupied by the respective valves to control the supply and return fluid, and a balanced piston in said cylinder which is movable away from that valve by which the return fluid passes upon a preponderance of pressure of the return fluid over the supply fluid permitting the return valve to move toward its seat.

2. Apparatus of the character described having a tread, a hydraulic motor for driving the tread, a fluid pump, fluid supply and return pipes connecting the pump with the motor, and means interposed in said pipes for preventing the motor from acting as a pump when the tractor goes down a hill, said means comprising a cylinder having a partition adjacent to each end provided with a valve seat corresponding portions of the supply and return pipes entering the cylinder at opposite sides of the partitions, a valve for each seat each having a stem extending inwardly of the cylinder, a piston occupying the substantial center of the cylinder, and means by which said piston is held in a balanced position, said piston moving away from the valve on the supply side when the pressure of the supply fluid predominates thereby unseating the return valve by engagement of the stem, and moving away from the valve on the return side when the pressure of the return fluid predominates thereby permitting the return valve to substantially close.

3. Apparatus of the character described having a tread, a hydraulic motor for driving the tread, a fluid pump, having a supply pipe terminating in a four-way valve casing, a fluid return pipe leading from the valve casing, a pair of pipes communicating from opposite sides of the casing with the motor, means interposed between said pipes for preventing the motor from acting as a pump when the tractor is moved down the hill, said means comprising a cylinder having valve seat partitions adjacent to each end at opposite sides of each of which said last pipes communicate, a pair of innermost partitions, a valve for each seat each having a stem extending inside of said innermost partitions, a balanced piston operable between said partitions being movable to unseat the return valve upon engagement with its stem by preponderating pressure in the supply fluid and movable toward the center of the cylinder upon preponderating pressure in the return fluid thereby permitting the return valve to move toward its seat, and a valve plug in said four-way casing by a shifting of which the motor is reversed as well as the functioning of said piston.

CHARLES LEON BOISSET.